United States Patent [19]
Brostowicz

[11] Patent Number: 5,634,430
[45] Date of Patent: Jun. 3, 1997

[54] REDUCED MESS BIRD FEEDER

[76] Inventor: Robert L. Brostowicz, 3313 N. 50th St., Milwaukee, Wis. 53216

[21] Appl. No.: 517,399

[22] Filed: Aug. 21, 1995

[51] Int. Cl.$^6$ .................................................. A01K 39/00
[52] U.S. Cl. ............................................................ 119/57.8
[58] Field of Search ...................................... 119/430, 431, 119/432, 454, 456, 466, 464, 475, 477, 57.8, 51.5, 57.9, 52.1, 52.2

[56] References Cited

U.S. PATENT DOCUMENTS

| | | |
|---|---|---|
| 157,012 | 11/1874 | Lindemann . |
| 184,178 | 11/1876 | Seyfang . |
| 1,575,101 | 3/1926 | Edwards . |
| 2,725,851 | 12/1955 | Futterer . |
| 3,888,211 | 6/1975 | Allen ........................ 119/18 |
| 4,112,871 | 9/1978 | Newman ................... 119/18 |
| 4,216,742 | 8/1980 | Kirchhofer ................ 119/18 |
| 4,399,772 | 8/1983 | Salinas ..................... 119/51.5 |
| 4,966,099 | 10/1990 | Arney ....................... 119/61 |
| 5,062,390 | 11/1991 | Bescherer ................. 119/72 |
| 5,467,738 | 11/1995 | Cass ....................... 119/51.5 X |
| 5,474,025 | 12/1995 | Lee .......................... 119/61 X |

*Primary Examiner*—Thomas Price
*Attorney, Agent, or Firm*—Donald J. Ersler

[57] ABSTRACT

A reduced mess bird feeder comprises a plurality of feeder dishes and a pedestal, the pedestal includes a base, a pair of locking fingers attached to the base, a shaft which extends upward from a top surface of the base and is terminated by a support block having a plurality of holes penetrating a top surface thereof, the feeder dish includes a bottom surface which slopes downward toward a second end of the feeder dish, a plurality of sides extend upward from the bottom surface and terminate at a top edge, a perch extends radially outward from a first end of the feeder dish, a dowel located substantially at the second end of the feeder dish extends downward perpendicularly from a top edge, the dowel in each feeder dish fits inside a corresponding hole in the support block. The reduced mess bird feeder is mounted by inserting the pair of locking fingers between the wires on the bottom surface of the cage and rotating the pedestal 90 degrees. A mounting block may be used when the cage has a solid bottom surface, a set of bores and slot are machined in the mounting block, locking fingers are inserted into the slot and the pedestal is rotated 90 degrees.

20 Claims, 7 Drawing Sheets

REDUCED MESS BIRD FEEDER

FIELD OF THE INVENTION

The present invention relates generally to bird feeders and more specifically to a reduced mess bird feeder which is designed so that a feeding bird leaves a reduced amount of bird food in an area outside the bird cage when compared to a conventional bird feeder.

DISCUSSION OF THE RELATED ART

For many years the conventional bird feeder has consisted of a cup or open box that is mounted to the side of a wired cage. The disadvantage of this design is that a large mess of bird food falls out of the feeder into an area outside the bird cage which has to be cleaned up after the bird is done feeding.

The prior art concerning bird feeders has been mostly directed at feeders that are modifications or improvements of side mounted bird feeders such as U.S Pat. Nos. 157,012, 181,178 and 4,112,871. However, U.S. Pat. No. 1,575,101 does discloses a center bird feeder but the center feeder in this bird cage cannot be easily adapted or mounted to a conventional bird cage. Further, this design requires a dish mounted underneath the bird feeder to catch falling bird food.

Accordingly, there is a clearly felt need in the art for a reduced mess bird feeder which allows a bird to feed without leaving a large mess of bird feed in an area outside the bird cage.

SUMMARY OF THE INVENTION

The primary objective of the present invention is to provide a bird feeder which allows a bird to feed without leaving a large mess of bird food in an area outside the bird cage. The present invention can also be easily mounted or removed from the bottom of a wire or solid bottom bird cage. The individual feeding dishes may also be removed easily while the base of the reduced mess bird feeder remains mounted to the bottom of the bird cage.

According to the present invention, a reduced mess bird feeder includes a plurality of feeder dishes and a pedestal. The pedestal includes a base having a top and bottom surface, a pair of locking fingers which extend from the bottom surface of the base, the pair of locking fingers are structured to engage the wires of a cage, a shaft extends upward from the top surface of the base and is terminated by a support block having a plurality of holes penetrating a top surface thereof.

A plurality of feeder dishes, each including a bottom surface which slopes downward toward a second end, a plurality of sides which extend upward from the bottom surface and terminate at a top edge. A perch with an oval shaped cross section extends radially outward from a first end of each feeder dish, a dowel located substantially at the second end extends downward perpendicularly from a top edge. The dowel in each feeder dish fits inside a corresponding hole in the support block. The reduced mess bird feeder is mounted by inserting the pair of locking fingers between the cage wires on the bottom of the cage at substantially the center and rotating the pedestal 90 degrees relative to the cage wires.

If the bird cage has a solid bottom, the reduced mess bird feeder may be attached to a mounting block. The mounting block is placed on the bottom of the solid bottom bird cage at substantially the center thereof. The mounting block has a bottom surface and a top surface. A set of bores and slot are formed in the mounting block, locking fingers are inserted into the slot and the pedestal is rotated 90 degrees. The mounting block need not be fastened to the bottom of the solid bottom bird cage because the mounting block is sufficiently heavy to prevent tipping.

The pedestal may also be fabricated from three separate elements. The three elements are a support block, a shaft and a base. The support block has a tapped hole in a bottom surface. The shaft includes a first threaded end and a second threaded end. The base has a tapped hole in a top surface. The pedestal is assembled by rotating the first threaded end of the shaft into the tapped hole in the base and by rotating the second threaded end of the shaft into the tapped hole in the support block.

Accordingly, it is an object of the present invention to provide a reduced mess bird feeder which eliminates most of the mess in the area outside of the bird cage resulting from bird food falling out of the feeder dish when the bird is feeding.

It is a further object of the present invention to provide a reduced mess bird feeder which can be easily mounted and removed from the bottom surface of a wire or solid bottom bird cage.

It is yet another object of the present invention to provide a reduced mess bird feeder which has a plurality of feeding dishes which are easily removable from the bird cage.

Finally, it is another object of the present invention to provide a reduced mess bird feeder having a perch with an oval shaped cross section.

These and additional objects, advantages, features and benefits of the present invention will become apparent from the following specification.

DETAILED DESCRIPTION OF THE PRESENT INVENTION

Figure 1:
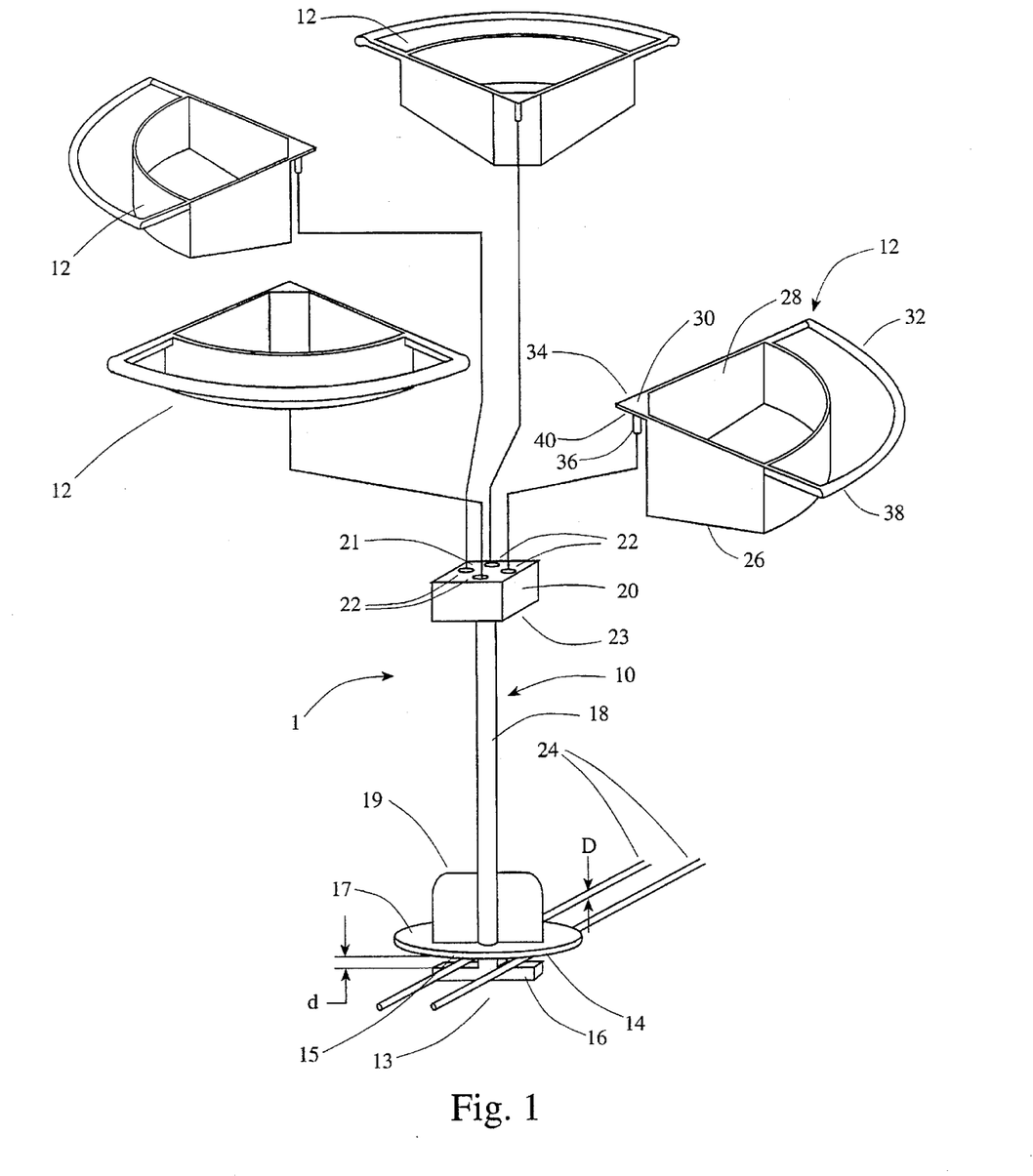
FIG. 1 is an exploded perspective view of a reduced mess bird feeder in accordance with the present invention.

With reference now to the drawings, and particularly to FIG. 1 there is shown an exploded perspective view of a reduced mess bird feeder 1 in accordance with the present invention. The reduced mess bird feeder 1 comprises a pedestal 10 and a plurality of feeder dishes 12.

The pedestal 10 includes a first end 13 and a second end 23. A base 14 is located at the first end 13 of pedestal 10. The base 14 has a bottom surface 15 and a top surface 17. A pair of locking fingers 16 extend from the bottom surface 15 of base 14. The pair of locking fingers 16 are parallel to the bottom surface 15 thereof. Dimension "d" is the distance between the pair of locking fingers 16 and the bottom surface 15 of base 14, dimension "d" is approximately 0.005–0.015 inches less than dimension "D" of the cage wire 24. A support block 20 is located at the second end 23 of the pedestal 10. A shaft 18 is disposed between the support block 20 and the base 14. A top surface 21 of support block 20 has a plurality of holes 22 molded or drilled therein. The pedestal 10 may be molded as one integral piece from a thermoplastic. A pair of support gussets 19 are molded as an integral part of the shaft 18 and the top surface 17 of the base 14. The pair of support gussets 19 increase the rigidity of the base 14 relative to the shaft 18.

Each feeder dish 12 includes a first end 32, a second end 34 and a sloping bottom surface 26. A plurality of sides 28 extend upward from the sloping bottom surface 26 and terminate at a common top edge 30. A perch 38 extends radially outward from the first end 32 of the feeder dish 12. A dowel 36 is located substantially at the second end 34 of the feeder dish 12, the dowel 36 extends downward perpendicularly from a bottom surface 40 of the top edge 30. At assembly, the dowel 36 of each feeder dish 12 fits respectively in one of the plurality of holes 22 located in the support block 20. The feeder dish 12 may be molded as one integral piece from a thermoplastic.

Figure 2:
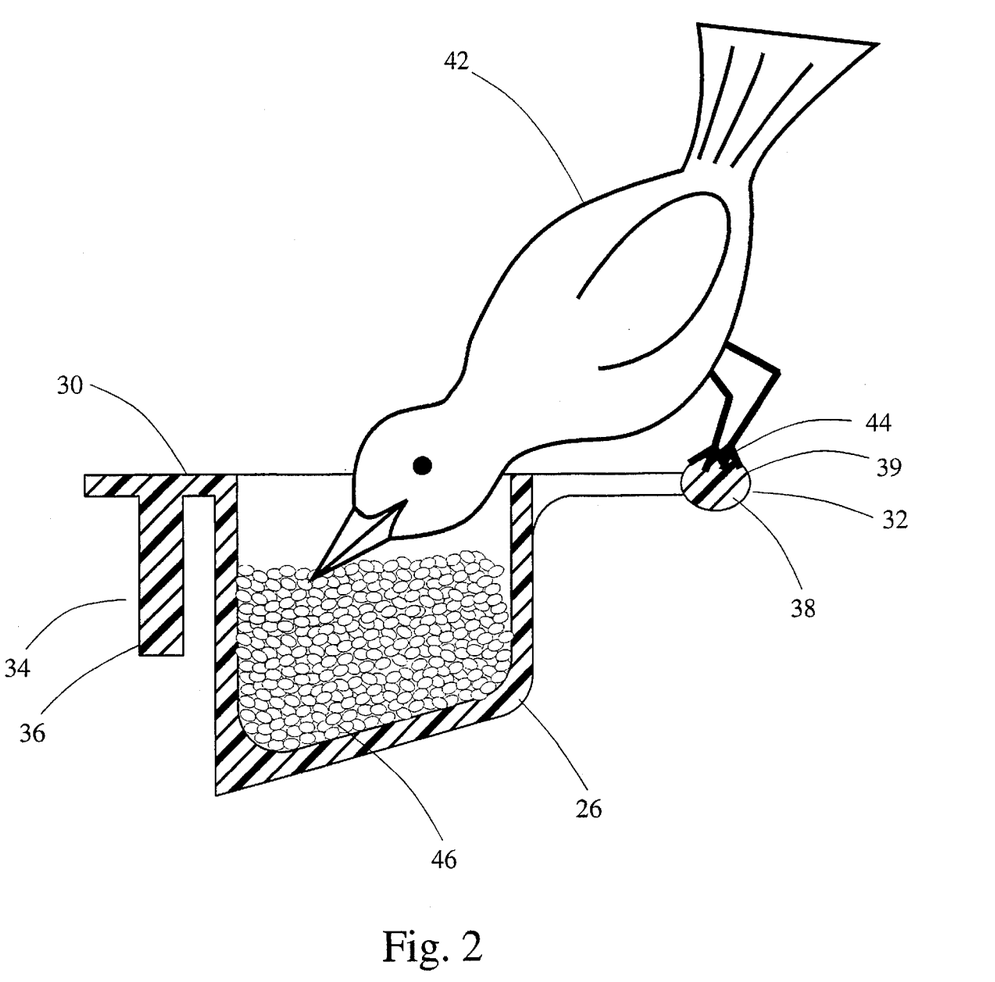
FIG. 2 is a cross sectional view of the feeder dish with a generic bird feeding in accordance with the present invention.

FIG. 2 shows a cross sectional view of the feeder dish 12. A generic bird 42 is holding onto the perch 38 with a set of feet 44 while feeding on a portion of food 46. The perch 38 has an oval shaped cross section 39 which is more comfortable for the feet of a bird than a conventional circular shaped cross section. The sloping bottom surface 26 is lower in depth at the second end 34 than at the first end 32 which causes the portion of food 46 to move toward the second end 34 instead of the first end 32 thereof. The first end 32 of each feeder dish 12 is the perimeter of each feeder dish, if the portion of food 46 moved toward the first end of feeder dish 12, the pellets of food 46 would fall into an area outside the bird cage, make a mess and be wasted. Each feeder dish 12 may be molded as one integral piece from a thermoplastic.

Figure 3:
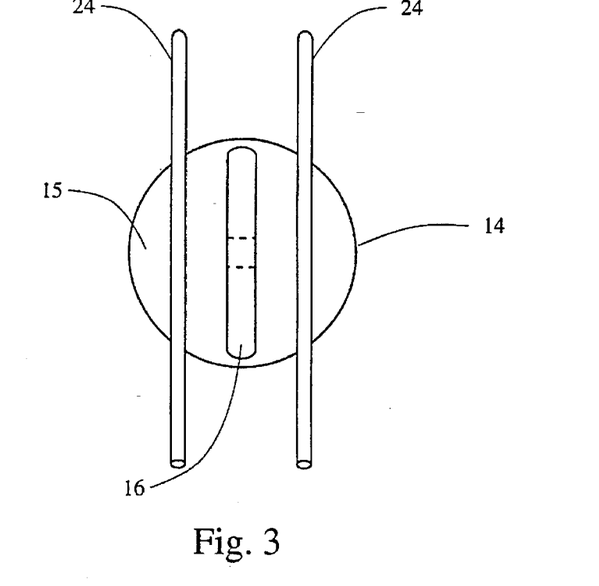
FIG. 3 is a bottom view of a base during mounting of the reduced mess bird feeder to the bottom of a wire cage in accordance with the present invention.
Figure 4:
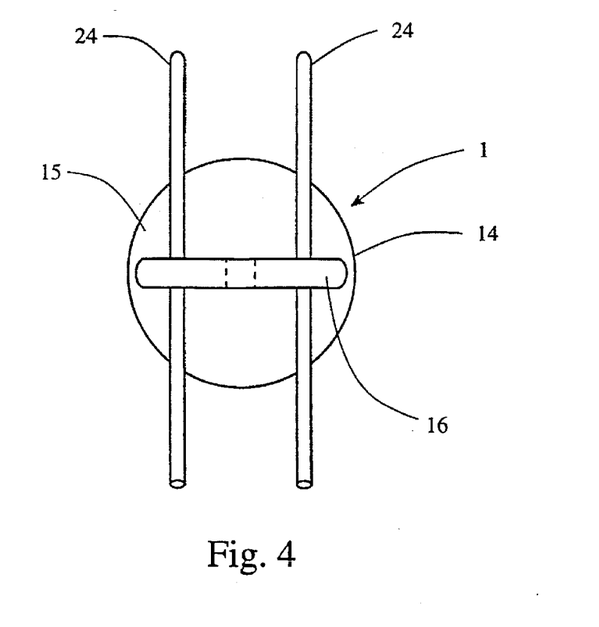
FIG. 4 is a bottom view of the base of the reduced mess bird feeder after 90 degree rotation in accordance with the present invention.

With reference to FIGS. 3 and 4, the fastening action of the pair of locking fingers 16 is illustrated. FIG. 3 shows a bottom view of the base 14 during mounting of the reduced mess bird feeder 1. FIG. 4 shows a bottom view of the base 14 of reduced mess bird feeder 1 after rotation of 90 degrees relative to the cage wires 24. In FIG. 3 the pair of locking fingers 16 are not in contact with cage wires 24, but the bottom surface 15 of base 14 is in contact with cage wires 24. Referring to FIG. 4, base 14 is rotated 90 degrees relative to the cage wires 24 which results in the reduced mess bird feeder being securely mounted to the cage wires 24. Also refer to FIG. 1 for another view of the engagement between the pair of locking fingers 16, the base 14 and the cage wires 24.

Figure 5:
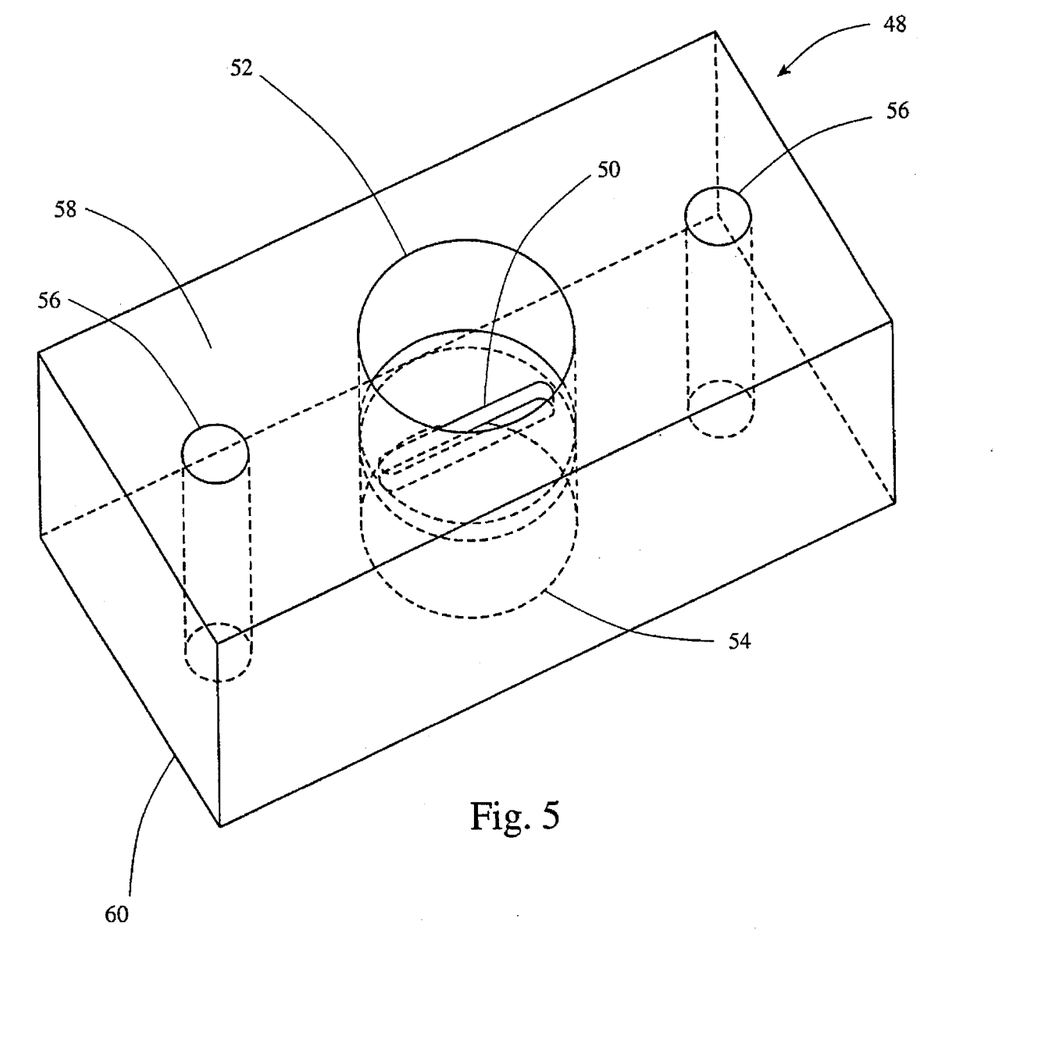
FIG. 5 is a perspective view of a mounting block to which the reduced mess bird feeder maybe fastened in accordance with the present invention.

FIG. 5 is a perspective view of a mounting block 48 which includes a top bore 52 that extends from a top edge 58 of the mounting block 48 until the top bore 52 is terminated by a slot 50. The slot 50 extends downward to a bottom bore 54 which is terminated by bottom edge 60 of the mounting block 48. A plurality of mounting holes 56 extend from the top edge 58 to the bottom edge 60 of the mounting block 48.

Figure 6:
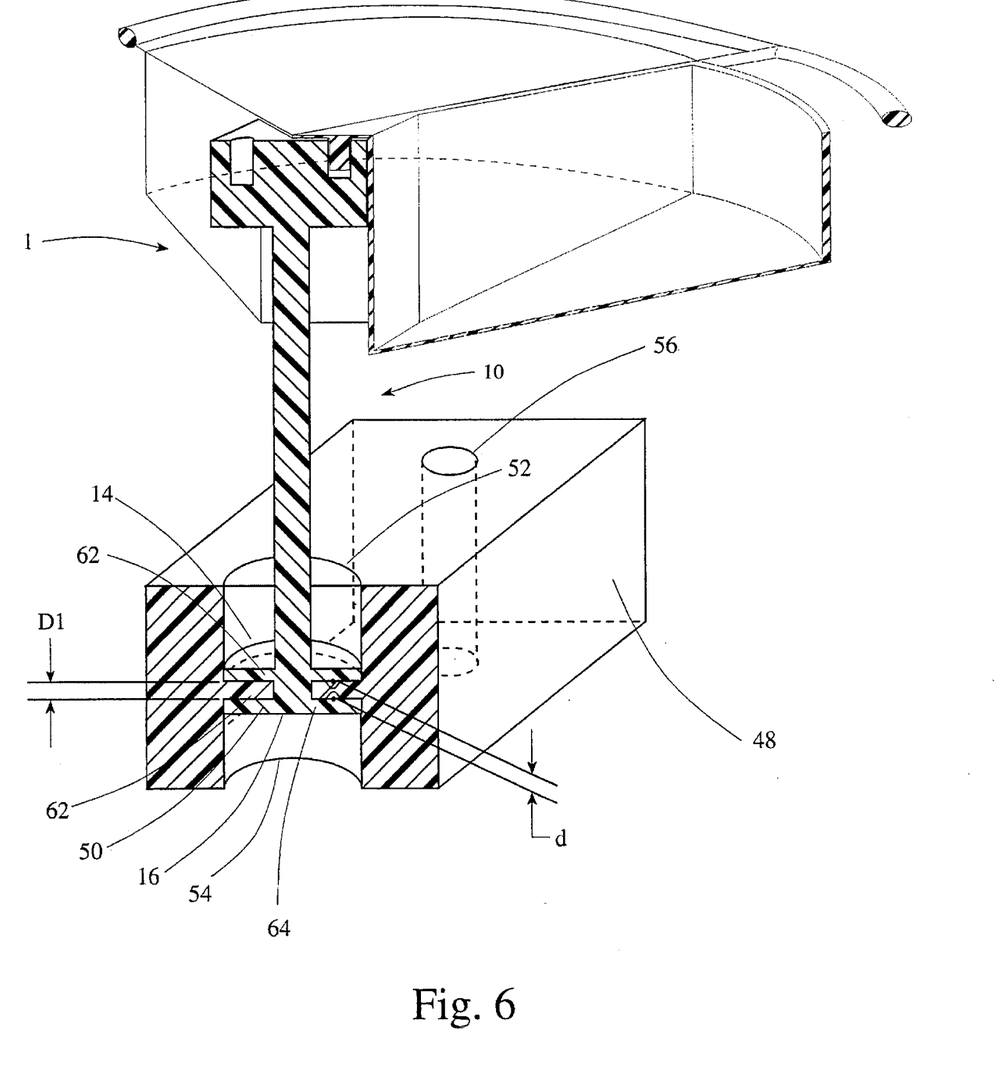
FIG. 6 is a cross sectional detail view of the reduced mess bird feeder being retained in the mounting block in accordance with the present invention.

FIG. 6 is a cross sectional detail view of the mounting block 48 structured to retain the reduced mess bird feeder 1. A web 66 is formed by a bottom surface 62 of the top bore 52 and a top surface 50 of the bottom bore 54, the web 66 has a thickness of dimension "D1." The distance between the pair of locking fingers 16 and the base 14 of pedestal 10 is dimension "d." The dimension "d" between the pair of locking fingers 16 and the base 14 is approximately 0.005–0.015 inches greater than dimension "D1" of the web 66.

The base 14 of the pedestal 10 is inserted into top bore 52 of mounting block 48 until the pair of locking fingers 16 pass through slot 50 into bottom bore 54 thereof. With reference to FIGS. 3 and 4 which illustrate the motion of the pair of locking fingers 16, reference to FIG. 5 which shows another view of the slot 50, the pedestal 10 is rotated 90 degrees relative to the slot 50. The web 66 of mounting block 48 fits between the base 14 and the pair of locking fingers 16, the pedestal 10 is securely retained in the mounting block 48.

The mounting block 48 is of sufficient weight that it need not be fastened to the bottom of a wire or solid bottom bird cage and yet support the reduced mess bird feeder 1. A plurality of mounting holes 56 are provided if user so desires to fasten the mounting block to the bottom of a wire or solid bottom bird cage.

Figure 7:
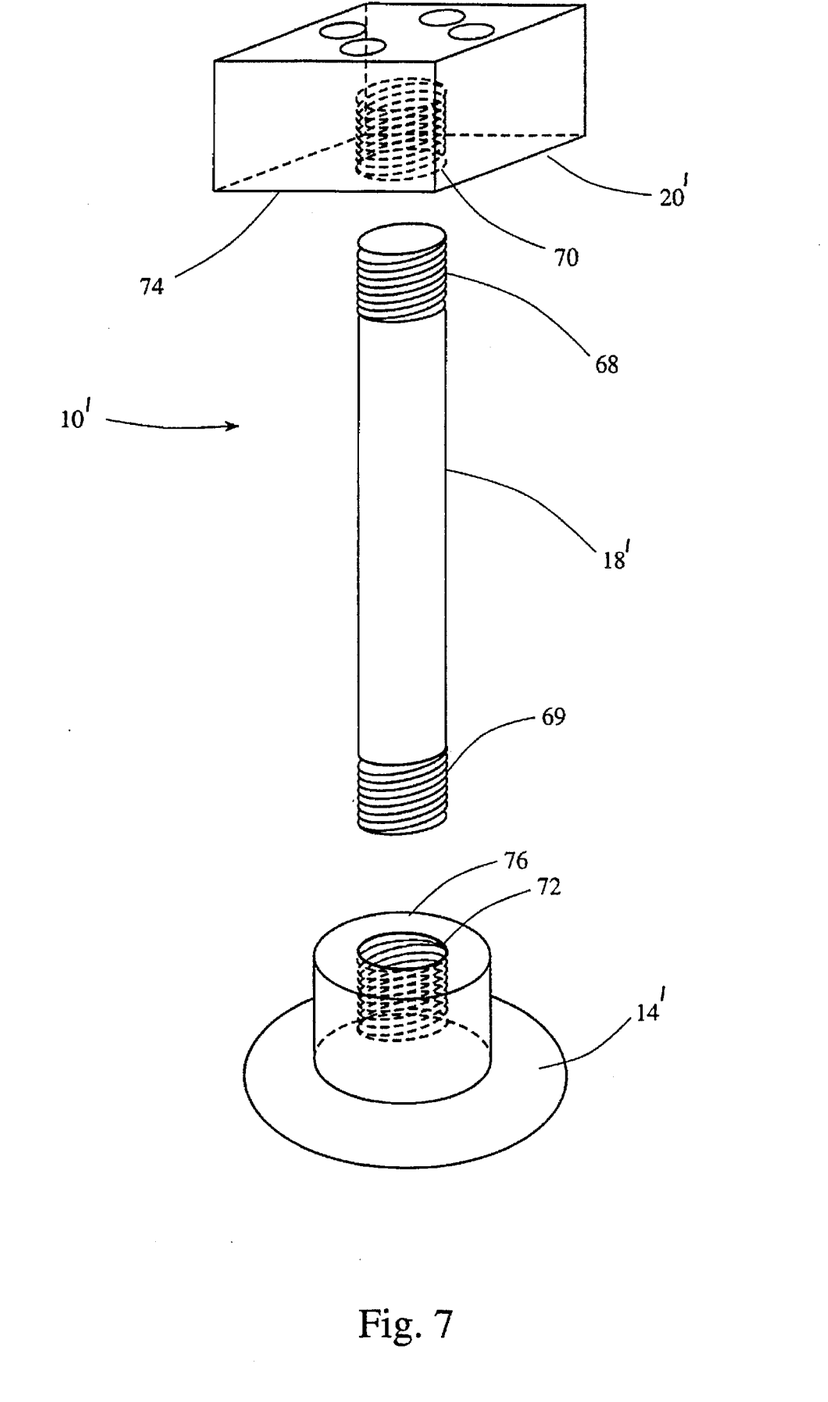
FIG. 7 is exploded perspective view of an alternative embodiment of a pedestal in accordance with the present invention.

FIG. 7 shows an alternative embodiment of the pedestal 10'. The pedestal 10' includes a support block 20', a shaft 18' and a base 14'. The support block 20' has a tapped hole 70 which extends from a bottom surface 74 of support block 20' and terminates at substantially the middle thereof. The shaft 18' includes a first threaded end 68 and a second threaded end 69. The base 14' includes a tapped hole 72 which extends from the top surface 76 to substantially the middle thereof.

The pedestal 10' is assembled by rotating the first threaded end 68 of shaft 18' into the tapped hole 72 of the base 14' and by rotating the second threaded end 69 of the shaft 18' into the tapped hole 70 of the support block 20'.

Figure 8:
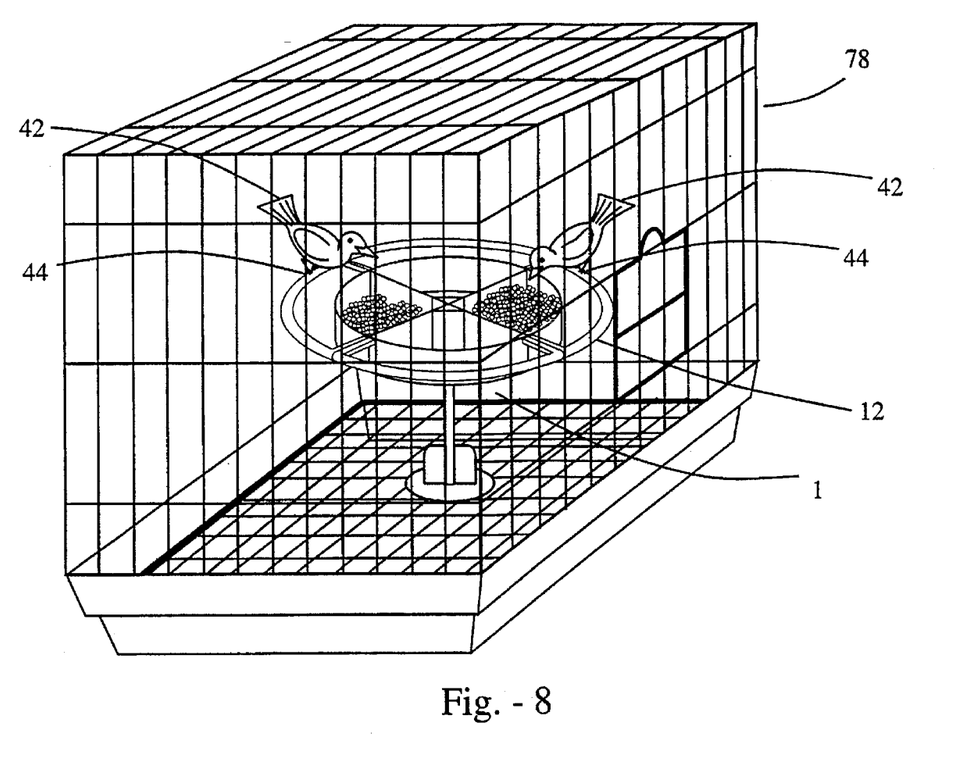
FIG. 8 is a perspective view of a wire bird cage with a reduced mess bird feeder mounted inside in accordance with the present invention.

FIG. 8 is a perspective view of a wire bird cage 78 with a reduced mess bird feeder 1 mounted inside the wire bird cage 78 at substantially the center thereof. Two generic birds 42 are perched on two of the plurality of feeder dishes 12 and are feeding on the portion of food 46 located in two of the plurality of feeder dishes 12.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A reduced mess bird feeder for use with a bird cage having cage wires comprising:

a pedestal having a first end and a second end;

a pair of locking fingers extending from said first end of said pedestal;

a support block located at said second end of said pedestal; and a plurality of feeder dishes, each said feeder dish having a sloping bottom surface, said plurality of feeder dishes being attached to said support block of said pedestal.

2. The reduced mess bird feeder for use with the bird cage having cage wires of claim 1 further comprising:

a base being disposed at said first end of said pedestal;

said base having a top surface and a bottom surface; and said pair of locking fingers extending from said bottom surface of said base, said pair of locking fingers being parallel to said bottom surface of said base.

3. The reduced mess bird feeder for use with the bird cage having cage wires of claim 2 further comprising:

said support block being disposed at said second end of said pedestal, said support block having a top surface with a plurality of holes formed therein;

a shaft being disposed between said top surface of said base and said support block of said pedestal; and a pair of support gussets which are molded as an integral part of said shaft and said top surface of said base, wherein said shaft is maintained perpendicular to said base.

4. The reduced mess bird feeder for use with the bird cage having cage wires of claim 3 further comprising:

each said feeder dish of said plurality of feeder dishes having a first end and a second end;

said sloping bottom surface being lower in depth at said second end than at said first end;

a plurality of sides extending upward from said sloping bottom surface and terminating at a top edge; and a dowel located substantially at said second end of each said feeder dish, said dowel extending downward from a bottom surface of said top edge, wherein said plurality of feeder dishes are assembled to said pedestal by inserting said dowel of each said feeder dish into each said hole in said support block.

5. The reduced mess bird feeder for use with the bird cage having cage wires of claim 4 further comprising:

a perch having an oval shaped cross section; and said plurality of feeder dishes, each said feeder dish having a first end, said perch extending radially outward from said first end of each said feeder dish.

6. A reduced mess bird feeder for use with a solid bottom bird cage comprising:

a pedestal having a first end and a second end;

a pair of locking fingers extending from said first end of said pedestal;

a support block located at said second end of said pedestal;

a plurality of feeder dishes, each said feeder dish having a sloping bottom surface; and a mounting block being structured to retain said pair of locking fingers, said plurality of feeder dishes being attached to said support block of said pedestal.

7. The reduced mess bird feeder for use with the solid bottom bird cage of claim 6 further comprising:

a base being disposed at said first end of said pedestal, said base having a top surface and a bottom surface;

said pair of locking fingers extending from said bottom surface of said base, said pair of locking fingers being parallel to said bottom surface of said base; and said mounting block having a top edge and a bottom edge, said mounting block having material removed from said top edge to form a top bore, said mounting block having material removed from said bottom edge to form a bottom bore, wherein said top bore has a bottom surface, said bottom bore has a top surface, said mounting block having material removed to form a slot between said bottom surface of said top bore and said top surface of said bottom bore.

8. The reduced mess bird feeder for use with the solid bottom bird cage of claim 7 further comprising:

said support block being disposed at said second end of said pedestal, said support block having a top surface with a plurality of holes formed therein;

a shaft being disposed between said top surface of said base and said support block of said pedestal; and a pair of support gussets which are molded as an integral part of said shaft and said top surface of said base, wherein said shaft is maintained perpendicular to said base.

9. The reduced mess bird feeder for use with the solid bottom bird cage of claim 8 further comprising:

each said feeder dish of said plurality of feeder dishes having a first end and a second end;

said sloping bottom surface being lower in depth at said second end than at said first end;

a plurality of sides extending upward from said sloping bottom surface and terminating at a top edge; and a dowel located substantially at said second end of each said feeder dish, said dowel extending downward from a bottom surface of said top edge, wherein said plurality of feeder dishes are assembled to said pedestal by inserting said dowel of each said feeder dish into each said hole in said support block.

10. The reduced mess bird feeder for use with the solid bottom bird cage of claim 9 further comprising:

a perch having an oval shaped cross section; and said plurality of feeder dishes, each said feeder dish having a first end, said perch extending radially outward from said first end of each said feeder dish.

11. A reduced mess bird feeder for use with bird cage having cage wires comprising:

a pedestal having a first end and a second;

a pair of locking fingers extending from said first end of said pedestal; and a plurality of feeder dishes, being attached to said second end of said pedestal.

12. The reduced mess bird feeder for use with a bird cage having wires of claim 11 further comprising:

a base being disposed at said first end of said pedestal, said base having a top surface and a bottom surface; and said pair of locking fingers extending from said bottom surface of said base, said pair of locking fingers being parallel to said bottom surface of said base.

13. The reduced mess bird feeder for use with a bird cage having wires of claim 12 further comprising:

a support block being disposed at said second end of said pedestal, said support block having a top surface with a plurality of holes formed therein;

a shaft being disposed between said top surface of said base and said support block of said pedestal; and a pair of support gussets which are molded as an integral part of said shaft and said top surface of said base, wherein said shaft is maintained perpendicular to said base.

14. The reduced mess bird feeder for use with a bird cage having wires of claim 13 further comprising:

each said feeder dish of said plurality of feeder dishes having a first end and a second end;

a sloping bottom surface being lower in depth at said second end than at said first end;

a plurality of sides extending upward from said sloping bottom surface and terminating at a top edge, and a dowel located substantially at said second end of each said feeder dish, said dowel extending downward from a bottom surface of said top edge, wherein said plurality of feeder dishes are assembled to said pedestal by inserting said dowel of each said feeder dish into each said hole in said support block.

15. The reduced mess bird feeder for use with a bird cage having wires of claim 14 further comprising:

a perch having an oval shaped cross section; and said plurality of feeder dishes, each said feeder dish having a first end, said perch extending radially outward from said first end of each said feeder dish.

16. A reduced mess bird feeder comprising:

a pedestal having a first end and a second;

a pair of locking fingers extending from said first end of said pedestal; and a plurality of feeder dishes, being attached to said second end of said pedestal.

17. The reduced mess bird feeder of claim 16 further comprising:

a base being disposed at said first end of said pedestal, said base having a top surface and a bottom surface;

said pair of locking fingers extending from said bottom surface of said base, said pair of locking fingers being parallel to said bottom surface of said base; and a mounting block having a top edge and a bottom edge, said mounting block having material removed from said top edge to form a top bore, said mounting block having material removed from said bottom edge to form a bottom bore, wherein said top bore has a bottom surface, said bottom bore has a top surface, said mounting block having material removed to form a slot between said bottom surface of said top bore and said top surface of said bottom bore.

18. The reduced mess bird feeder of claim 17 further comprising:

a support block being disposed at said second end of said pedestal, said support block having a top surface with a plurality of holes formed therein;

a shaft being disposed between said top surface of said base and said support block of said pedestal; and a pair of support gussets which are molded as an integral part of said shaft and said top surface of said base, wherein said shaft is maintained perpendicular to said base.

19. The reduced mess bird feeder of claim 18 further comprising:

each said feeder dish of said plurality of feeder dishes having a first end and a second end;

a sloping bottom surface being lower in depth at said second end than at said first end;

a plurality of sides extending upward from said sloping bottom surface and terminating at a top edge; and a dowel located substantially at said second end of each said feeder dish, said dowel extending downward from a bottom surface of said top edge, wherein said plurality of feeder dishes are assembled to said pedestal by inserting said dowel of each said feeder dish into each said hole in said support block.

20. The reduced mess bird feeder of claim 19 further comprising:

a perch having an oval shaped cross section; and said plurality of feeder dishes, each said feeder dish having a first end, said perch extending radially outward from said first end of each said feeder dish.

\* \* \* \* \*